(12) United States Patent
Hughes, Jr.

(10) Patent No.: US 8,656,303 B2
(45) Date of Patent: Feb. 18, 2014

(54) METHOD AND SYSTEM FOR CERTIFYING WEBFORMS

(75) Inventor: Larry J Hughes, Jr., Mercer Island, WA (US)

(73) Assignee: Larry J. Hughes, Jr., Mercer Island, WA (US)

( * ) Notice: Subject to any disclaimer, the term of this patent is extended or adjusted under 35 U.S.C. 154(b) by 394 days.

(21) Appl. No.: 12/707,670

(22) Filed: Feb. 17, 2010

(65) Prior Publication Data

US 2010/0211907 A1    Aug. 19, 2010

Related U.S. Application Data

(60) Provisional application No. 61/153,237, filed on Feb. 17, 2009.

(51) Int. Cl.
*G06F 3/14* (2006.01)

(52) U.S. Cl.
USPC ............... 715/781; 705/9; 705/14; 707/100; 713/172

(58) Field of Classification Search
USPC .......... 715/200–277, 700–867; 700/701–866; 709/201–229; 705/9, 14, 50–79; 345/30–111; 348/206–231.9; 707/100, 707/200–206; 713/172
See application file for complete search history.

(56) References Cited

U.S. PATENT DOCUMENTS

| | | | |
|---|---|---|---|
| 2002/0087411 A1* | 7/2002 | Rossides | 705/14 |
| 2004/0172403 A1* | 9/2004 | Steele et al. | 707/100 |
| 2010/0332837 A1* | 12/2010 | Osterwalder | 713/172 |
| 2011/0029351 A1* | 2/2011 | Intemann et al. | 705/9 |

* cited by examiner

*Primary Examiner* — Ruay Ho

(57) ABSTRACT

The technology disclosed relates to certifying a webform. A Declarant desires to publish a plurality of facts it asserts about a webform's posting location. The Declarant constructs a formatted digital declaration of facts and presents it to a Certifier requesting a signed declaration of facts. The Certifier examines the declaration in accordance with its operating policy and assembles a signed declaration of facts indicating its confidence that the facts are true. A Client encounters a webform in a hypermedia document that is or might be certified and requests information from the Certifier about the facts and the Certifier's confidence that the facts are true. The Certifier presents its signed declaration of facts and confidence to the Client in a manner such that the Client can render the facts and confidence information prior to the user manipulating the webform.

10 Claims, 10 Drawing Sheets

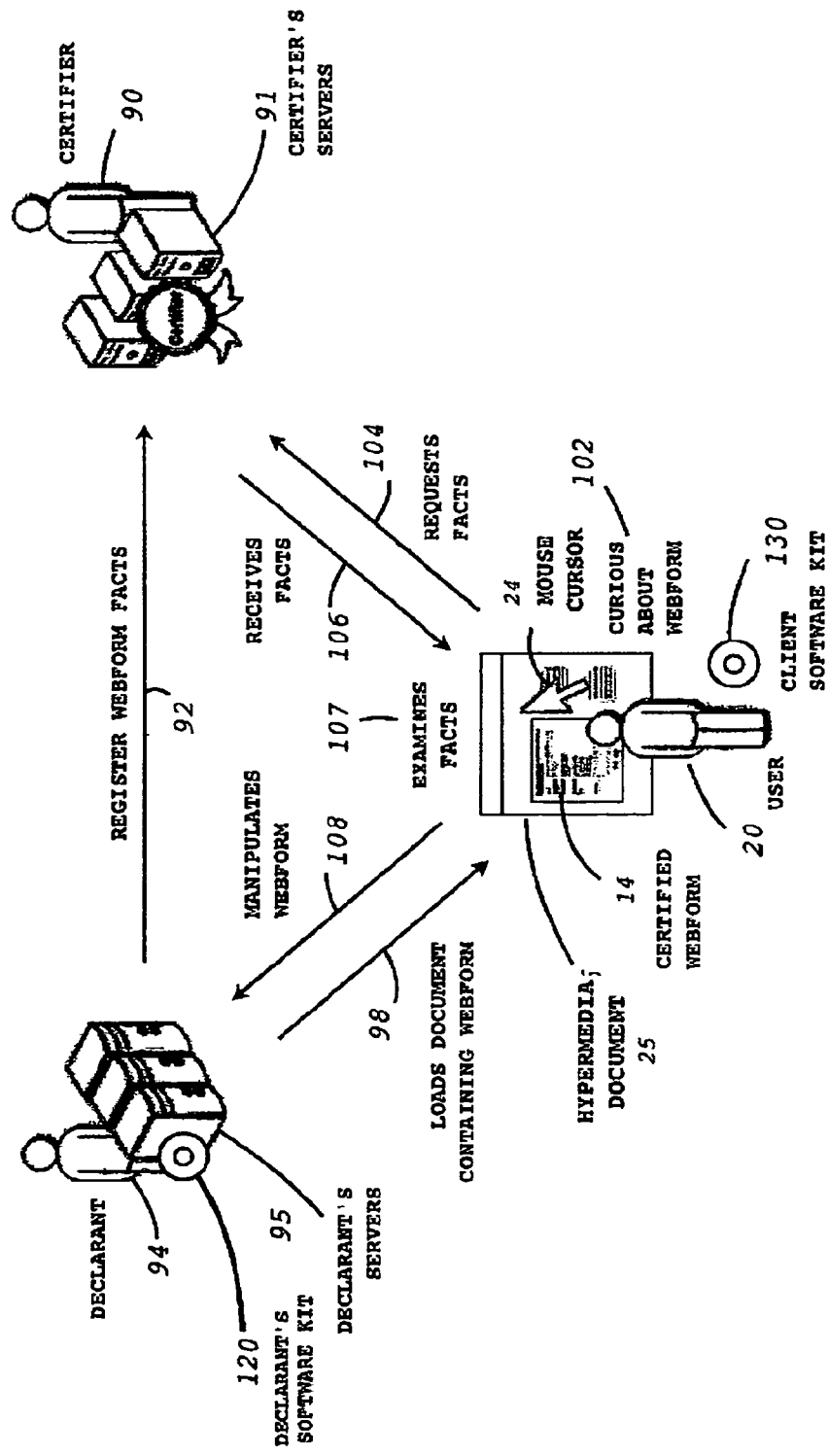

EXAMPLE CERTIFIED WEBFORM FACT-NAMING SYNTAX IN URL FORM

METHOD AND SYSTEM FOR CERTIFYING WEBFORMS

CROSS-REFERENCES TO RELATED APPLICATIONS

The present application claims the benefit under 35 U.S.C. Section 119(e) of U.S. Provisional Application No. 61/153,237, filed Feb. 17, 2009, titled METHOD AND APPARATUS FOR CERTIFYING WEBFORMS, and is related to U.S. application Ser. No. 12/617,682, filed Nov. 12, 2009, titled METHOD AND APPARATUS FOR CERTIFYING HYPERLINKS, and U.S. Provisional Application No. 61/113,511, filed Nov. 11, 2008, titled METHOD AND APPARATUS FOR CERTIFYING HYPERLINKS, which are herein incorporated by reference in their entirety.

BACKGROUND

A webform provides a means for a hypermedia Client application to populate an arrangement of data fields and submit ("post") them to a web server for processing. Each datum associated with a webform corresponds to one named instance of one webform control in the webform. For example, a datum named "Bank Branch" might contain the value "1910 Otlet Ave" to reflect the user's selection from a pull-down menu.

To aid the understanding of the disclosed technology, it is helpful to immediately acknowledge three relevant characteristics of webforms.

First, a webform can contain its own text, images and background as well as manipulating controls (sometimes called widgets) like textboxes, pull-down menus and buttons.

Second, a webform's posting destination is expressed as a Universal Resource Locator (URL) in the markup. This specification therefore refers to a webform's destination URL as its "posting URL."

Third, application developers are historically inclined to cloak a webform's posting URL from the user. Indeed, some hypermedia Client applications, including certain versions of the most popular browsers, will only reveal a posting URL to the most advanced users capable of de-obfuscating markup languages and programming code.

For simplicity of understanding the disclosed technology, this specification uses the following abbreviated terms. Unless otherwise indicated, the abbreviated terms are used in a manner as would be understood by those of ordinary skill in the art but are described here to aid the reader.

1. The term "document" means any hypermedia object addressable by a URL. Documents might be of fixed size and static as with a web page or audio file served out of a folder, continuous as with a streamed live videocast, or dynamic as with a page programmatically constructed in real time using data from a database. They may also take other embodiments. In this specification a document is assumed to contain at least one webform except where otherwise indicated.
2. The term "user" means a human interactively operating a computer.
3. The term "computer" means a wired or wirelessly networked device having a CPU, memory, internal and/or external persistent storage, running an operating system and software applications, and possibly having a screen, keyboard, mouse, or their functional equivalents. Applicable computer types include laptops and their desktop equivalents, racked servers, smart phones, PDAs, set-top boxes, game players, music players.
4. The term "click," aside from its expected meaning, includes any stimulatory action taken by a user in the course of manipulating a control in a graphical user interface. This includes pressing a keyboard key, or with the proper interfaces, touching a screen, voicing a command, nodding a head, blowing into a tube, and so on.
The term "Declarant" means an entity which has been vetted for legitimacy that wishes to declares facts about webforms.
5. The term "certified webform" means a webform determined to by a Certifier to have facts associated with it, whereby the facts are declared by a Declarant, and in which the Certifier is prepared to state his confidence. The reader will appreciate that this definition soon becomes clearer.

The term "decertified webform" means a webform that was formerly certified but no longer is, and for which the Certifier has dissociated its respective formerly associated facts. Reasons that a Certifier might decertify a webform might include that the Declarant has withdrawn the facts, or that the Certifier has withdrawn them due to losing trust in the Declarant, or for any other reason of its choosing.

Examining the half-century history of hypertext, and the current nature of hypermedia, it is clear that they were designed to operate under two assumptions that are pertinent to the disclosed technology. There is the assumption that entities authoring hypermedia create webforms that accurately and adequately represent their purposes and authors. There is also the assumption that entities authoring hypermedia create webforms that pose no threat to users. These were originally reasonable assumptions, but no longer, and far from it.

The disclosed technology addresses the threat of fraud presented to users as a direct result of manipulating a webform. Simply put, a user manipulates webform, naively expecting a benign result, and unsuspectingly experiences a malevolent one.

It is significant that the disclosed technology pertains not to just submitting the webform, but to manipulating it in general. To give merely one example, a threat scenario exists whereby an unwitting user types his login credentials into a webform, then at the last moment decides to cancel rather than submit. A clever fraudster might have placed a double-wide submit button in the webform that gives the appearance of neighboring cancel and submit buttons. Regardless of which "button" he presses, the form is posted and the user receives little if any cues of having his credentials compromised.

The massive adoption of online commerce and social media has motivated fraudsters to leverage them in order to promulgate webform manipulation attacks at global scale. They are discussed at length in literature elsewhere, so only two distilled examples are provided here.

1. With phishing, a user manipulates a fraudulent webform. He is visually or auditorially duped into submitting information of personal value, for example, the login credentials used to access his bank account online.
2. With drive-by malware, a user manipulates a fraudulent webform. This causes a hypermedia script to execute that silently hijacks their computer, and is then HTTP redirected to land on the expected legitimate page.

The rising magnitude of risk would be diminished by system that complements pre-existing existing technologies through providing them with an interoperable contrast. The sum of pre-existing solutions suffer from at least three material shortcomings:

First, known techniques build upon an insufficient basis in fact. The prevailing technique is accurately characterized by "this webform has not been reported as fraudulent, therefore it must be legitimate." The reader is asked to consider that before sharing sensitive information with a mortgage broker or investment banker over the telephone, it may be wise to know more about the party on the other end than whether or not they have been arrested for an unnamed crime in their past. Such information is helpful, but insufficient, to establish the safekeeping of sensitive personal information. More helpful would be knowing a number independently verifiable facts: many customers he has, how long he has been in business, how a statistically valid sampling of his customers rate their satisfaction with his service, and so on.

Second, known techniques establish fraudulence after the webform has already been publicly availed, often for many hours or days after victims began falling. However, webform fraud is often heavily "front-loaded," that is, use of a fraudulent webform generally peaks rapidly and quickly reaches the point of diminishing returns. The effectiveness of those technologies lose bite at a rate measured in hours if not minutes.

Third, known techniques judge a webform fraudulent as much by the document that contains it as by the webform itself. This "all or nothing" method makes it undesirable for a webform owner to permit other document authors to publish his webform in their documents; if one author's document that contains the webform is deemed fraudulent—even incorrectly—all documents containing the webform run the risk of being deemed fraudulent.

It is the intent of the disclosed technology to provide thought-provoking windfall benefits for webform usage that may only in retrospect be seen as having pent-up demand. One such example provided elsewhere in this specification describes an embodiment whereby a webform owner can make his webform portable to other document owners while preserving all assurance about the webform offered by the disclosed technology.

SUMMARY

To address the above mentioned problem and others, the technology disclosed herein is a system for providing facts to a requestor about a webform. In one embodiment the requestor is a web browser operated by a user who wants to know the facts about the webform before manipulating it.

In one embodiment, the Certifier is a server computer. A Declarant enrolls with the Certifier with a self-chosen strength of authentication. Upon enrollment, the Declarant provides facts to be associated with a webform and the Certifier produces a signed declaration of facts along with a confidence value related to the strength of authentication or other factors. One with ordinary skill in the art will appreciate that this is another way of saying that the Certifier, when conveying the facts associated with a webform to a requestor, is in effect telling the requestor that the facts are being conveyed on behalf of the Declarant and that they may therefore be trusted.

In the preferred embodiment, the Declarant is a merchant declaring facts about webforms which play a core role in producing its revenue. By nature it is those webforms which are prone to being fraudulently imitated. (The reader is asked to consider that fraudsters could not otherwise capitalize on phishing or drive-by malware attacks.) The disclosed technology aims to make such attacks irrelevant, by allowing a merchant to provide a user with an arbitrarily detailed and verifiable set of that the merchant alone is qualified to state. This starkly contrasts with the constellation pre-existing technologies, all of which are suppositional and oddly enough are produced by entities except the merchant, who alone is the authority. Prominent examples include reputation-based systems and content analysis systems.

To declare facts about a webform and request their certification, a Declarant must first be vetted as part of an enrollment process with a Certifier to be established as a legitimate entity. In one embodiment of the disclosed technology, a Declarant is required to possess one or more Extended Validation (EV) SSL Certificates, which are granted only after a rigorous manually intensive vetting process performed by a recognized SSL Certificate Authority. For example, one representative class of EV SSL certificate holders is publicly traded companies. Until the enrollment is completed, the Certifier will refuse to provide the Declarant with Declarant services.

The system allows for the Declarant and Certifier to each verify the identity of the other. In one embodiment of the disclosed technology, the registration process concludes with the Declarant and Certifier exchanging cryptographic credentials that will be used to establish identity for future communications requiring authentication.

The system allows for facts about a webform to be certified, regardless of when the webform was or will be created. In one embodiment of the disclosed technology, all of the facts about the webform are treated as virtual, and no in-line changes to the webform's content are required to publish the facts. This preserves forward and backward compatibility with webforms not, or alternatingly, participating in the system.

The system allows for a Declarant to request the Certifier to certify and decertify facts about a webform as often as the Declarant wishes.

The system allows for a Certifier to calculate its degree of trust for a Declarant, and to publish it as a confidence metric to a Client desiring to consume the Declarant's facts. In one embodiment of the disclosed technology, the Certifier might indicate that it trusts a Declarant completely, or not at all, or at a point between, or with caveats. In another embodiment of the disclosed technology, the Certifier itself is allowed to participate in the system also as a Declarant.

The system allows for a Certifier to calculate its degree of trust in a particular fact asserted by a Declarant, and to announce it as a confidence metric to a Client desiring to consume that Declarant's fact. In one embodiment of the disclosed technology, the Certifier might indicate that despite having high confidence in the Declarant's identity, it has a low confidence in the Declarant's assertion of certain facts.

The system allows for the Certifier to present facts to the Client about a webform, along with its confidence in the Declarant's identity and its confidence in certain facts asserted by the Declarant. In one embodiment of the disclosed technology, the Certifier might express a superior degree of trust in a Declarant's identity and a superior degree of trust in certain facts the Declarant asserts, and Clients treat the facts accordingly.

The system allows for the Client to retrieve facts about a webform from the certifier, and render them to the user for consideration before the user manipulates the webform. In one embodiment of the disclosed technology, the Certifier emphasizes the availability of certified facts about a webform when the document that contains it is rendered for the user; for the facts to also be rendered for the user either automatically or upon request with a simple mouse gesture; and to comfort the user, for the facts to be rendered in a special window.

The system allows for the user to experience an alternate mode of interaction with a certified webform that is reserved for certified webforms. In one embodiment of the disclosed technology, when the webform is given focus, it "lifts" out of the document and is rendered in a special window for manipulation by the user.

The system allows for facts to be provided to users about webforms through a Client application that supports application plug-ins, or for which the program source code is available, or which can use a proxy intermediate that handles the work. In one embodiment of the disclosed technology, a PDF document viewer that supports plug-ins is extended with certified webform logic for webforms in PDF documents. In another embodiment of the disclosed technology, a B2B client application that runs in batch (unattended) mode is extended with features that permit it to access and validate information about a server application operated by another business (say, the XML schemas it relies on) about a B2B server application operated by another business that requires the use of HTTP or HTTPS "POST" operations.

The system allows for a Certifier to publish its own vetting criteria, for consideration by Declarants and users when deciding if they wish to trust the Certifier (according to their own chosen criteria) for information about certified webforms according to their own criteria.

The system allows for a plurality of Certifiers to operate either independently for its own constituents, or in chosen cooperation with each other for shared constituents. In one embodiment of the disclosed application, there is one Certifier. In another embodiment of the disclosed technology, some Certifiers agree to participate in a web of trust and periodically share confidence identity and confidence information about Declarants, and facts and confidence information about webforms. In another embodiment, a Client requests facts about certified webform from multiple Certifiers, and applies its own logic to determine its degree of trust in the facts The system allows for the Certifier's server to protect itself from unintentional and intentional abuse (denial of service attacks) by requiring Client software to be registered with the Certifier's server, without such registration that requests to resolve facts about certified webforms will be denied. In one embodiment of the disclosed technology, a script that installs the Client libraries on the user's computer that resolve certified webforms, automatically performs the registration process for the user, providing no personal information about the user; for the script and the Certifier's server perform a globally unique cryptographic key exchange so they can mutually authenticate when the Client wishes to resolve facts about certified webforms; for the server to continually track its interactions with the server; for the server to periodically examine the tracking information for patterns pertaining of abuse it exhibits, possibly in conjunction with other Clients; for the server to thereafter to throttle and possibly discontinue altogether resolving facts about certified webforms for that Client.

The system allows for a Declarant to declare as facts about a webform any checks and balances for applying against a published copy of the webform in order to determine its legitimacy. In one embodiment of the disclosed technology, the Declarant indicates that a webform's legitimacy can be established by the presence and correctness of controls in the webform, possibly dismissing visual and other characteristics of the webform. In another embodiment of the disclosed technology, the Declarant indicates that the published copy of a webform must include among other factors a certain image (say, a certification logo) in order to be considered legitimate. In another embodiment of the disclosed technology, the Declarant indicates that the published copy of the webform must be a wholesale match with of a canonical version of the webform made accessible to the Client.

The system allows for a Client to recognize that although a webform in a document is certified, the document publishing it is not authorized to do so. In one embodiment of the disclosed technology, the Client recognizes this condition and prevents the user from manipulating the webform from within the document.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

These and other allowances made within the scope of the disclosed technology may collectively be referred to as "webform certification services."

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 illustrates the steps involved for a Declarant to certify a webform; for a client to determine if a webform is certified; and how the user interacts with a certified webform in one embodiment of the disclosed technology;

DETAILED DESCRIPTION

Figure 1:
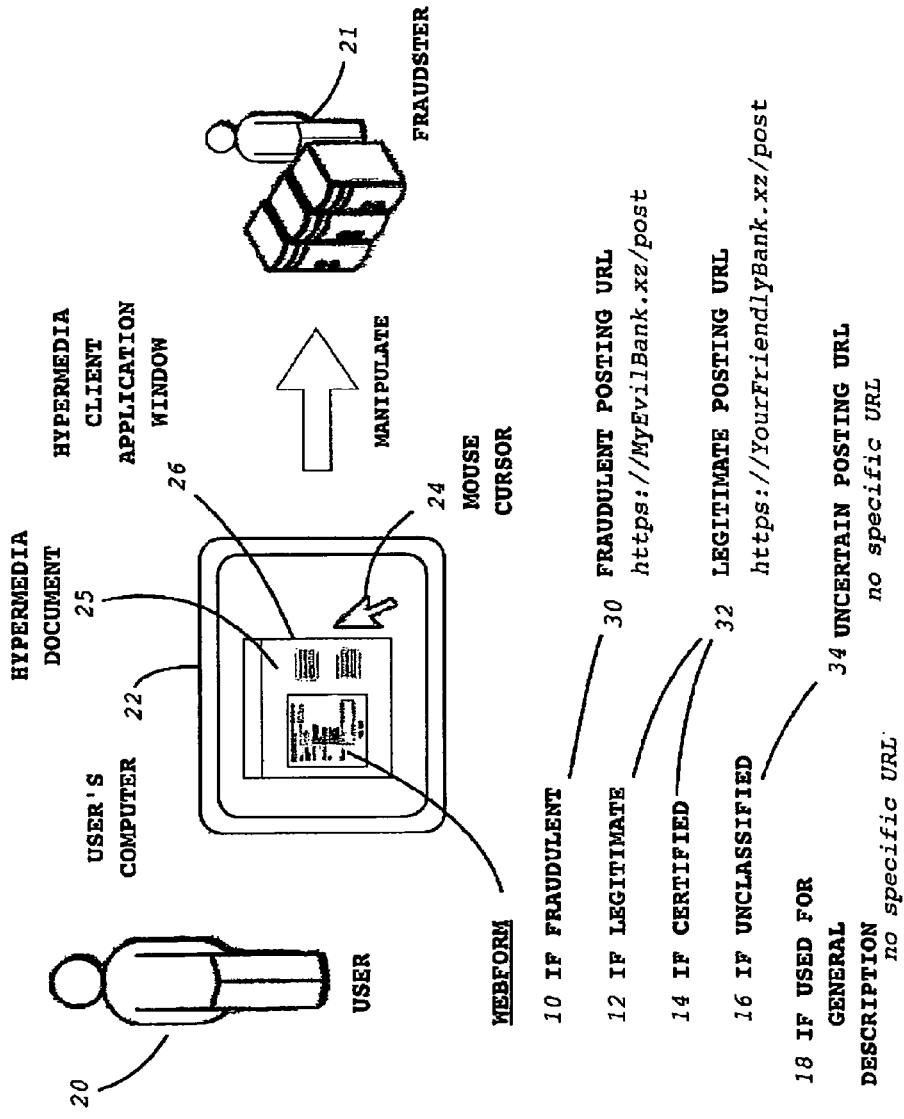
FIG. 1 illustrates the environment in which a user encounters webforms.
Figure 2:
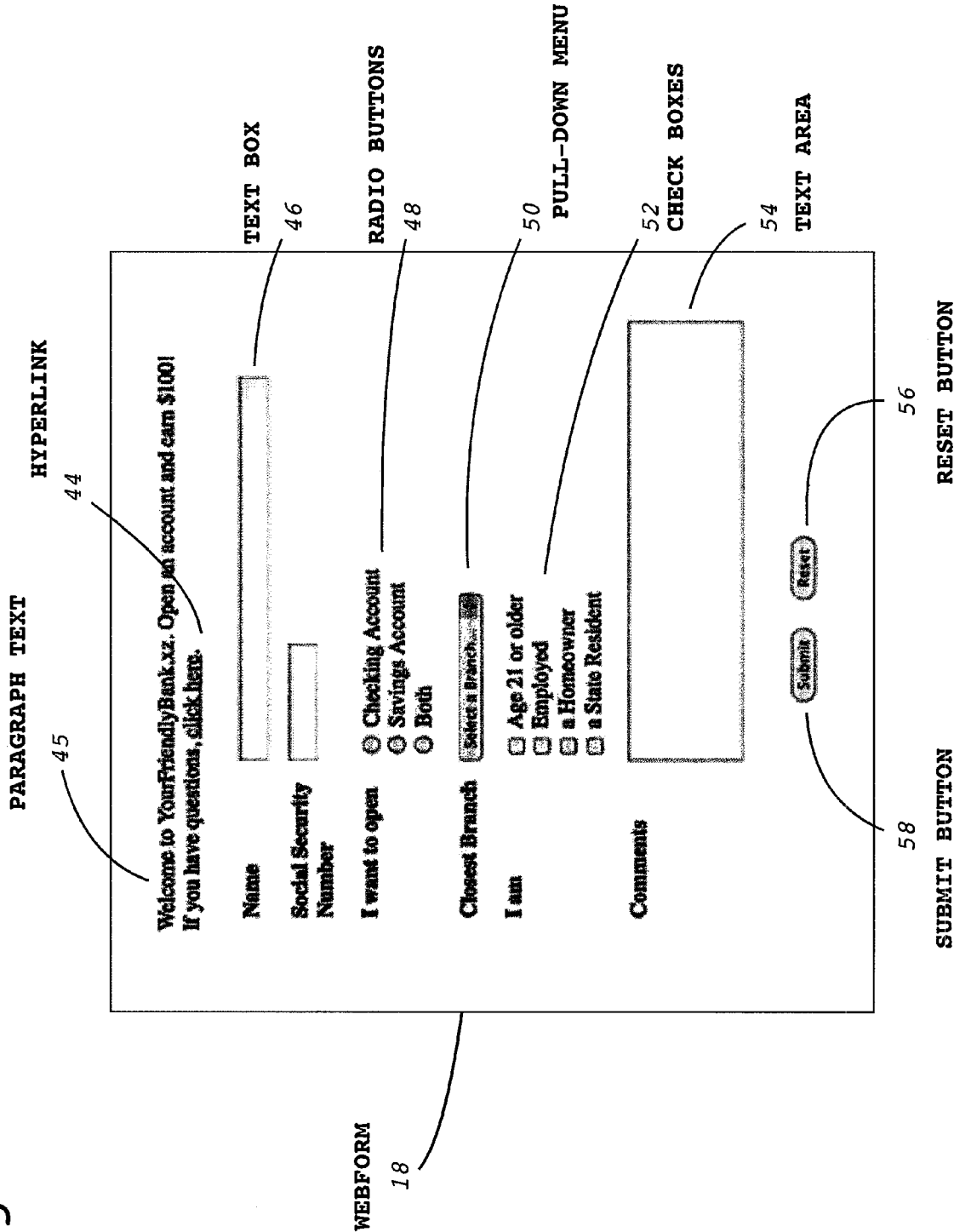
FIG. 2 illustrates a prototypical webform containing various content and controls.

FIG. 1 shows an example environment where a user 20 is likely to experience a fraudulent webform 10. The user's computer 22 is running a hypermedia Client application 26 in order to display a hypermedia document 25 containing a webform 16 over which a mouse cursor is placed 24. Depending on circumstance, regarding the webform's legitimacy it is to be deemed one of:

A fraudulent webform 10. It is understood to have a fraudulent posting URL 30 of https://MyEvilBank.xz/post A legitimate webform 12 that happens not to be certified. It is understood to have a legitimate posting URL 32 of https://YourFriendlyBank.xz/post A certified webform 14 that by definition is also legitimate. It also has a certified posting URL 32 of https://YourFriendlyBank.xz/post A unclassified webform 16. It implies a webform that at the moment is neither deemed fraudulent nor legitimate A general webform 18. This implies a webform in the most general case, i.e. where its classification is not relevant to the point being described FIG. 2 illustrates a general webform 18. It contains paragraph text 45 and a hyperlink 44 to a destination outside the webform. The webform controls illustrated include a text box 46, radio buttons 48, a pulldown menu 50, checkboxes 52, a text area 54, a reset button 56 and a submit button 58.

Virtually all prior techniques that address the fraudulent webform problem have a basis in testing for the presence of a webform's posting URL in one or more compilations of suspect URLs (blacklists). Software on the user's computer 22 determines if a general webform's posting URL 18 appears on blacklists either in a local file resident on the user's computer 22 or by sending a request to a remote blacklist server. A general posting URL 18 determined to be a fraudulent posting URL 10 joins a blacklist in ways that generally include a threshold number of naive humans manually reporting it, and it being subsequently manually verified by a threshold number of humans with advanced skill in the art. Some other techniques involve software that scours the Web employing algorithms that aim to detect fraudulent webform content. There are many blacklists, some public and constructed by volunteers, and some proprietary and constructed by software vendors and service providers.

Figure 3A:
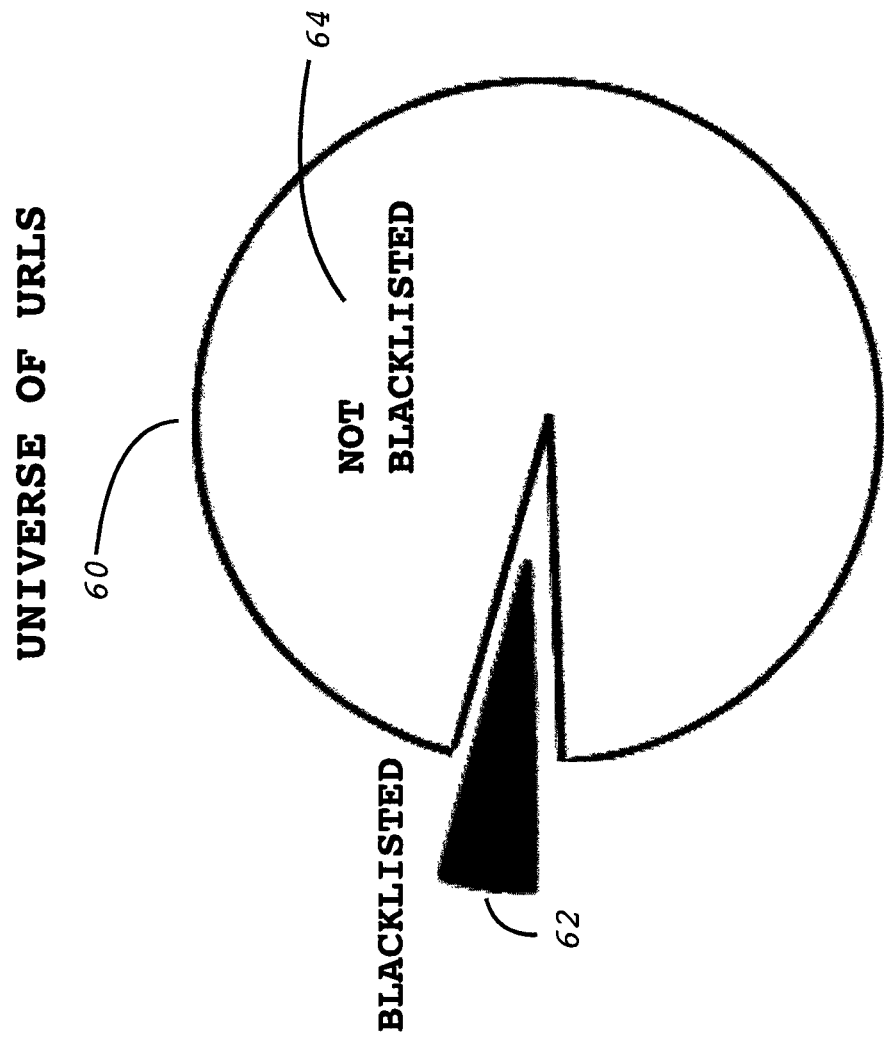
FIG. 3A illustrates the universe of URLs from the perspective of pre-existing technologies pertaining to fraudulent webforms.

FIG. 3A illustrates how the pre-existing technologies effectively divide the universe of URLs 60 into two sets, namely those that are blacklisted 62 and those that are not blacklisted 64. This perspective is helpful to the user, however is a far cry from a sufficient solution. It lacks efficacy in at least four noteworthy ways:

1. Blacklists only alert the user to fraudulent webforms 10 or ones believed to be fraudulent. The user is left to draw his own conclusions about all other webforms 18.
2. Blacklists are by definition always outdated. Indeed, a fraudulent posting URL 30 is frequently blacklisted one or more days after the fraudulent webform content has been publicly availed.
3. Blacklists present material maintenance challenges. Indeed, sometimes several months transpire before a fraudulent blacklisted URL is removed from a blacklist.
4. A fraudulent webform 10 in a document 25 is deemed to pollute its entire document 25, and a fraudulent document 25 containing a general webform 18 is deemed to pollute the general webform 18. Though this may seem productive at first, it is a far cry from optimal. Many cases have been witnessed where this "all or nothing" approach has empowered fraudsters 21 (and not a few pranksters) to inflict branding and financial damage on some of the most respectable online businesses.

Figure 3B:
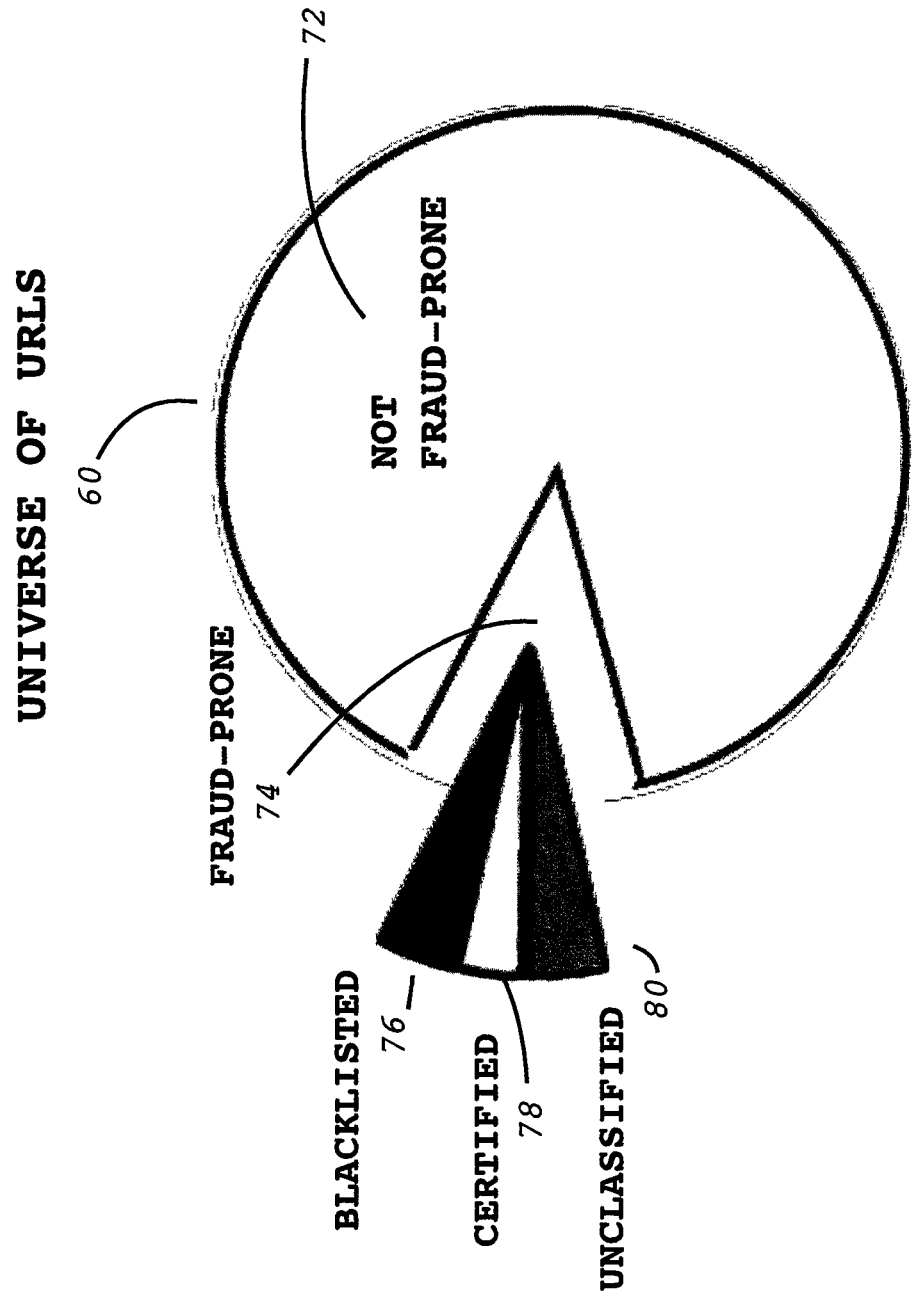
FIG. 3B illustrates the universe of URLs from the perspective of the disclosed technology pertaining to fraud-prone and not fraud-prone webforms, the former subdivided into ones blacklisted, ones certified, and ones unclassified.

FIG. 3B illustrates the alternate and complementary perspective of the disclosed technology. It effectively divides the universe of URLs 60 into two sets—those fraud-prone 74 and those not fraud-prone 72—and of those fraud-prone, three subsets—those having certified facts 78, those blacklisted 76 and those unclassified 80.

FIG. 4 shows one embodiment of a system for informing a user of a certified webform 14 in accordance with an embodiment of the disclosed technology. A Certifier 90, which is implemented as a sever computer 91, receives a request from a Declarant 94 to register one or more webform facts 92 associated with a webform. The Certifier 90 performs due diligence on the facts and stores the facts and its confidence that the facts are true for use by Clients.

The user 20 at 98 navigates hypermedia documents with his computer 22 and encounters a document 25 with a general webform 18 in it. At 102 the user 20 is curious about a certified webform. The user indicates their curiosity about the certified webform without manipulating the webform. Software on the user's computer recognizes that the user is interested in the certified webform and sends a request at 104 asking if the Certifier 90 has a signed declaration of the facts for the webform. At 106, the Certifier 90 returns the signed declaration including the facts given to it by the Declarant and may include an indication of the Certifier's confidence that the facts are true. At 107, the user examines the facts and agrees that the webform is legitimate. At 108 he manipulates and submits the webform with confidence.

Figure 5A:
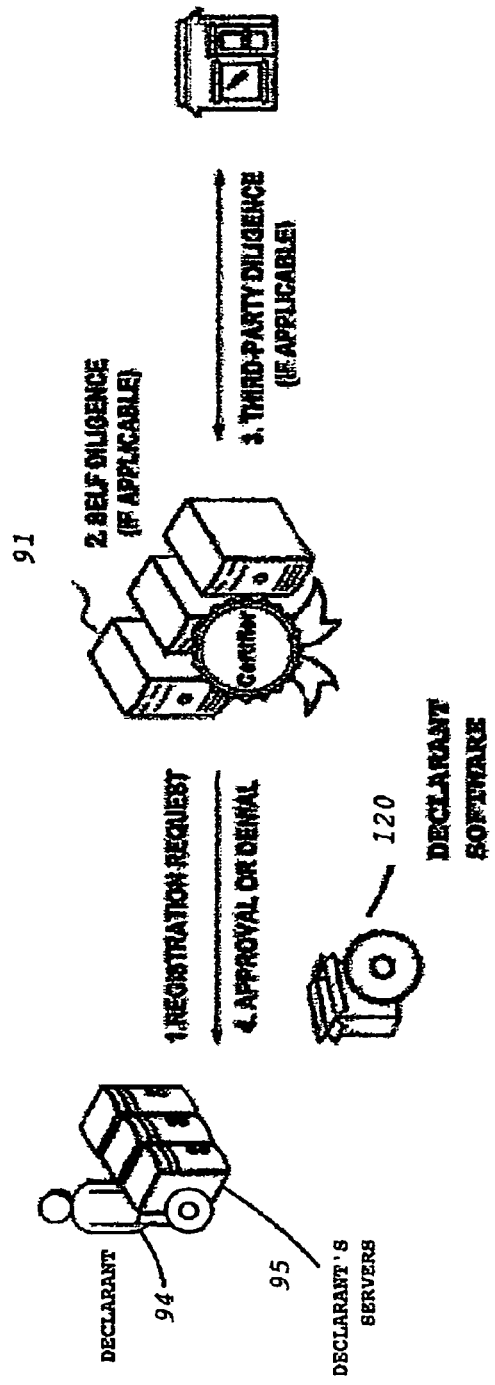
FIG. 5A illustrates the steps involved in a Declarant's enrollment with the Certifier.

FIG. 5A shows the steps performed by a Certifier 90 under software control to certify a webform. A Declarant 94 obtains a Declarant software kit 120 that when installed on the Declarant's computer 94 runs an enrollment script in order to enroll the Declarant with the Certifier. In one embodiment, the installation process:

generates the Declarant's GUID (global unique identifier);
generates its asymmetric keypair;
generates a self-signed authentication certificate containing the generated GUID;
gathers version numbers of the Declarant's computer's operating system, shared libraries and other runtime foundations;
gathers the version numbers any Client-supported applications (e.g., web browsers, email Clients);
gathers computer hardware parameters helpful for troubleshooting;
prompts the Declarant to select one or more means of authentication having various strengths to be used when managing its declarations of facts with the Certifier. Options include:
None (i.e. the Declarant provides no authentication credentials),
Weak (e.g. the Declarant provides its e-mail address),
Strong (e.g. the Declarant provides a symmetric key)
Maximum (e.g. the Declarant asymmetrically encrypts a nonce provided by the Certifier using the Declarant's private key associated with an SSL certificate already in its possession)
Manual (e.g. the Certifier checks various third sources to confirm the identity of the Declarant after which the remainder of the registration process is completed manually)

Next, the enrollment script causes the Declarant's computer 95 to assemble the above information into a Declarant enrollment message and transmit it to the Certifier 90, after first verifying that certifier's identify. In one embodiment of the disclosed technology, the Declarant 94 verifies that the Certifier's current cryptographic credentials in the form of an X.509 certificate descends from the X.509 certificate bundled in the Declarant software kit 120.

Upon receipt of the Declarant registration message, the Certifier does diligence to confirm, i.e., vet, the identity and/or the trustworthiness of the Declarant 94. In one embodiment, the Certifier's diligence is performed in accordance with the Declarant's chosen strength of authentication. If Manual authentication is selected then the registration process is completed when the diligence is completed. If Maximum authentication is selected, in one embodiment the Certifier 90 verifies that a nonce was correctly encrypted by the Declarant 94. If not, registration is not completed.

The Certifier 90 executes program instructions to respond with the Declarant's own X.509 certificate, now countersigned by the Certifier 90, along with any executable files, configuration files and other items needed for runtime.

Henceforth, whenever the Declarant 94 communicates with Certifier 90 for Declarant services, the Declarant 94 mutually authenticates the channel with the Declarant's X.509 certificate. In addition, the Declarant 94 uses one of his selected means to authenticate himself for a given communication.

Once enrolled, the Declarant 94 is free to assert facts about legitimate webforms 12. In one embodiment, the Declarant 94 decides on a legitimate webform 12 to be certified. Next, software on the Declarant's computer 120 assembles one or more facts to be associated with the legitimate webform 18. For example, such facts could include site information such as the name and address of the Declarant, the date of its domain name registration, the date of the first appearance of content on its site, the validity period for its SSL certificates, and so on. If the Declarant 94 is not the owner of the webform content then such facts could also include site information such as the name and address of the content owner, the date of its domain name registration, the date of the first appearance of content on its site, the validity period for its SSL certificates, and so on.

In one embodiment, the facts might also include information about the precise chain of HTTP re-directs that the application is expected to follow between form posting and landing on a subsequent document. The facts might also include for example the webform's expiration date, or a revision history of the webform, or other imaginative yet useful facts.

The Declarant's computer 95 submits a certification request message to the Certifier 90 specifying the legitimate webform posting URL 32 and the one or more facts, either through the Certifier's extranet (if one exists) or through software provided with the Declarant's software kit 120. The message is sent using one of the means of authentication the Declarant 94 selected during its registration process.

Upon receipt of the message, the Certifier 90 evaluates the request, taking into account its policy, the scope of the claim, and the Declarant's means of authentication. The Certifier 90 executes instructions to determine its confidence in the facts and certifies the facts in accordance with the Certifier's confidence that the facts are true, by digitally signing the declaration. The confidence values may be indicators such as Absolute, High, Moderate, Low, None etc. or other values that are meaningful to a user. In one embodiment, the confidence values are a function of the strength of authentication. For example, a Maximum confidence value is given to facts from a Declarant's high authentication strength.

The Certifier 90 stores the digitally signed declaration of facts in a database. The Certifier 90 sends an acknowledgement message to the Declarant 94 with a copy of the signed declaration, which the Declarant 94 is free to distribute or not. The policy of the Certifier 90 is a statement of rules and procedures that it will follow when vetting the identity of Declarants 94 and the rules and procedures it will use to certify facts about legitimate webforms 12 about to be certified.

In one embodiment, a Declarant 94 may also request that the Certifier 90 decertify a webform by sending a message to the Certifier 90. Upon receipt of the message, the Certifier 90 evaluates the request, taking into account its policy, the scope of the claim, and the Declarant's means of authentication. The Certifier 90 marks the status of the certified webform 14 as decertified in a database and sends an acknowledgement message to the Declarant 94.

Figure 5B:
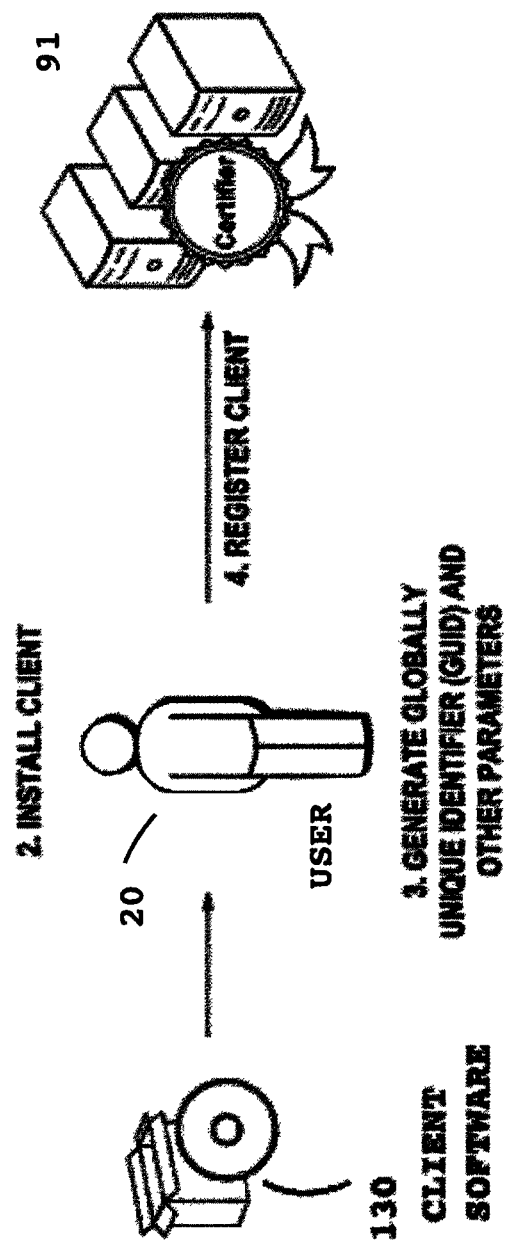
FIG. 5B illustrates the steps involved in installing the Client software on a user's computer and registering the Client with the Certifier.

FIG. 5B shows steps performed to register a user 20 with the Certifier 90. In one embodiment, a user 20 obtains user Client software kit 130 with software that:

generates the Client's GUID (global unique identifier);
generates an asymmetric keypair;
generates a self-signed authentication certificate containing the generated GUID;
gathers version numbers of the Client's computer's operating system, shared libraries and other runtime foundations;
gathers the version numbers any Client-supported applications (e.g., web browsers, email Clients);
gathers computer hardware parameters helpful for troubleshooting;
Unless the user desires anonymity, the Client software kit prompts the user for a unique authentication credentials e.g. user name, password, etc.

Next, the Client software kit 130 assembles the above information into a Client registration message and transmits it to the Certifier 90, in one embodiment after first verifying that the Certifier's X.509 authentication certificate descends from the same root of the one bundled in the Client software kit 130.

Upon receipt of the Client's registration message, the Certifier 90 responds with the Client's own X.509 authentication certificate, now countersigned by the Certifier 90, along with any executable files, configuration files and other items needed for runtime.

Henceforth, whenever the Client communicates with Certifier 90, it mutually authenticates the channel with the Client's authentication certificate. In addition, the user 20 uses the credentials he supplied during the registration process to authenticate himself for a given communication with the Certifier 90.

In one embodiment, the user is provided with one or more plug-ins for one or more hypermedia Client applications to detect a certified webform 14 and provide facts associated with the certified webform. For example, plug-ins are provided for web browsers, e-mail clients, spreadsheets, word processing programs, drawing programs, document viewers, presentation programs etc.

In one embodiment of the disclosed technology, the plug-in recognizes a general webform 14 that might be certified through one or more of several methods such as by asking the Certifier 90 if the Certifier 90 has a signed declaration of facts for the webform 14.

Alternatively, the plug-in can first determine if the webform can be ruled out prior to querying the Certifier. For example, not all applications need concern themselves with all certified webforms. A given application might need to regard only HTTPS posting URLs and no others (e.g. HTTP, FTP). It may be wasteful to attempt resolution of any others. The Client allows for an artificial reduction in the set of potentially certified webforms. It accomplishes this by applying a series of configurable regular expressions against posting URLs. Those that match one of the expressions are regarded as potentially certified, all others not. Returning to the HTTPS example, the set of potentially certified webforms are those whose URLs match the regular expression "^HTTPS://.*" (assuming URLs are normalized to upper case). Such regular expressions can be used to rule out webforms with posting URLs in the .edu top level domain for example.

In some embodiments, an application may maintain its own record of webforms previously encountered that were certified. The record can then be consulted to determine if a webform is certified in lieu of or in addition to the other methods described.

Although the above description describes determining if a single webform is certified, the plug-in may determine if a number of webforms are certified.

Figure 6:
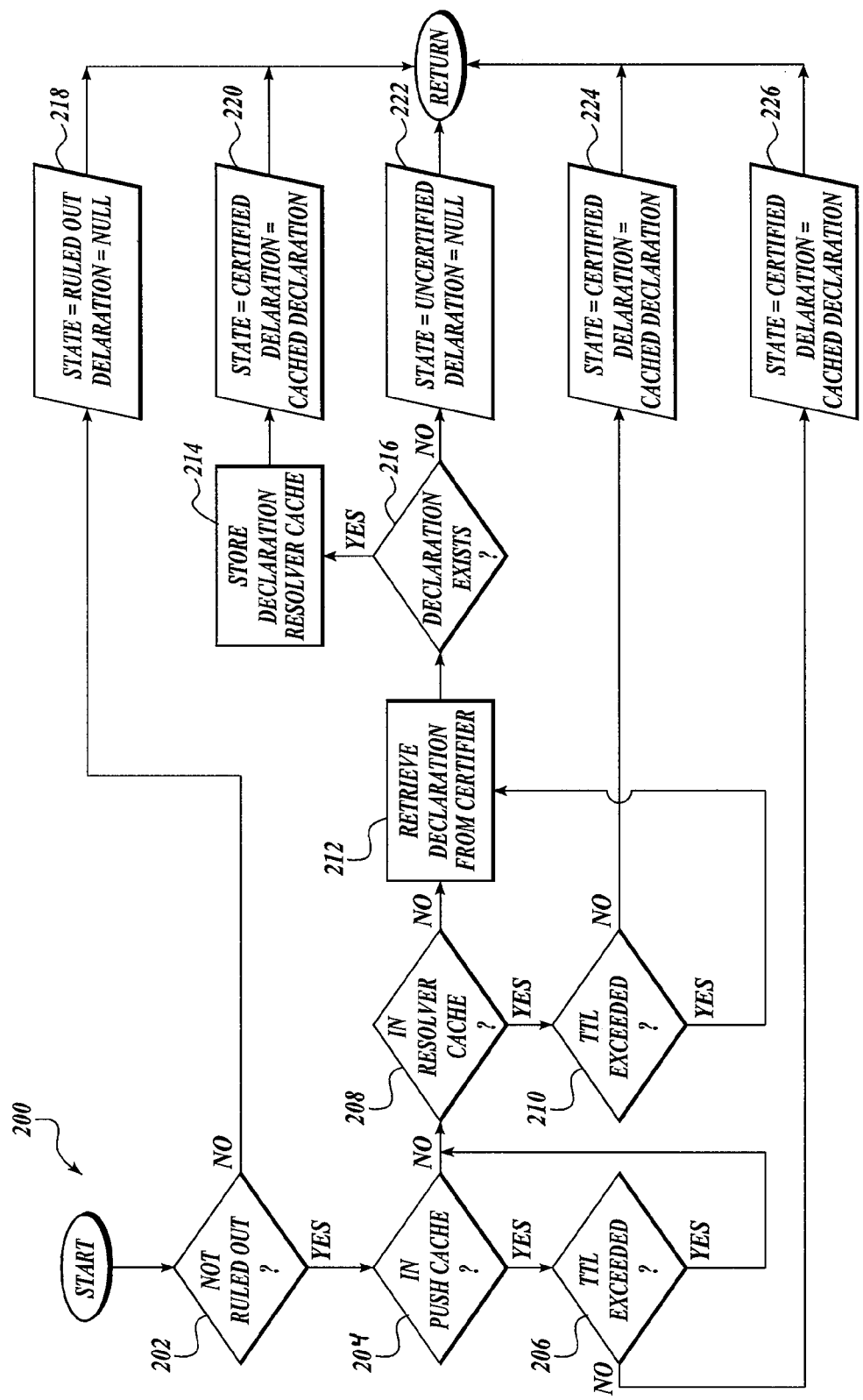
FIG. 6 is a flowchart of the steps performed by a client computer to retrieve a signed declaration of the facts associated with a certified webform.

FIG. 6 is a flowchart of steps performed by a plug-in to retrieve a signed declaration of facts associated with a certified webform. Beginning at 202 the plug checks to see if the webform should be ruled out based on regular expression matching as described above. At 204, the plug-in checks to see if the Certifier has previously pushed the signed declaration of facts into the Client's push cache. If so, the plug-in checks to see if the time-to-live is exceeded at 206. If so, then the processing proceeds to 208 where the plug-in checks to see if the signed declaration of facts is in the resolver cache. If so, the plug-in checks to see if the time-to-live is exceeded at 210. If so, then processing proceeds to 212 where the plug-in sends a message to the Certifier requesting the signed declaration of facts. If at 216 they are found to exist, then they are stored in the resolver cache at 214 and processingproceeds to 220 where the plug-in returns a state value of "certified" and a declaration value of the cached declaration.

If the answer at 216 is no, then processing proceeds to 222 where the plug-in returns a state value of "un-certified" and declaration value of null.

If the answer at 202 was no, and the webform should be ruled out, then processing proceeds to 218 where the plug-in returns a state value of "ruled out" and a declaration value of null.

If the answer at 210 is no, then processing proceeds to 224 where the plug-in returns a state of "certified" and a declaration value of the cached declaration.

If the signed declaration is not in the push cache at 204, then processing proceeds to 208 where the plug-in checks to see if the signed declaration is in the resolver cache 216. If so processing proceeds to 210 as indicated above.

If the answer to 206 is no, then processing proceeds to 226, where the plug-in returns a state value of "certified" and declaration value of the cached declaration.

At 222 the plug-in returns a state value of "un-certified" and a declaration value of null.

Figure 7:
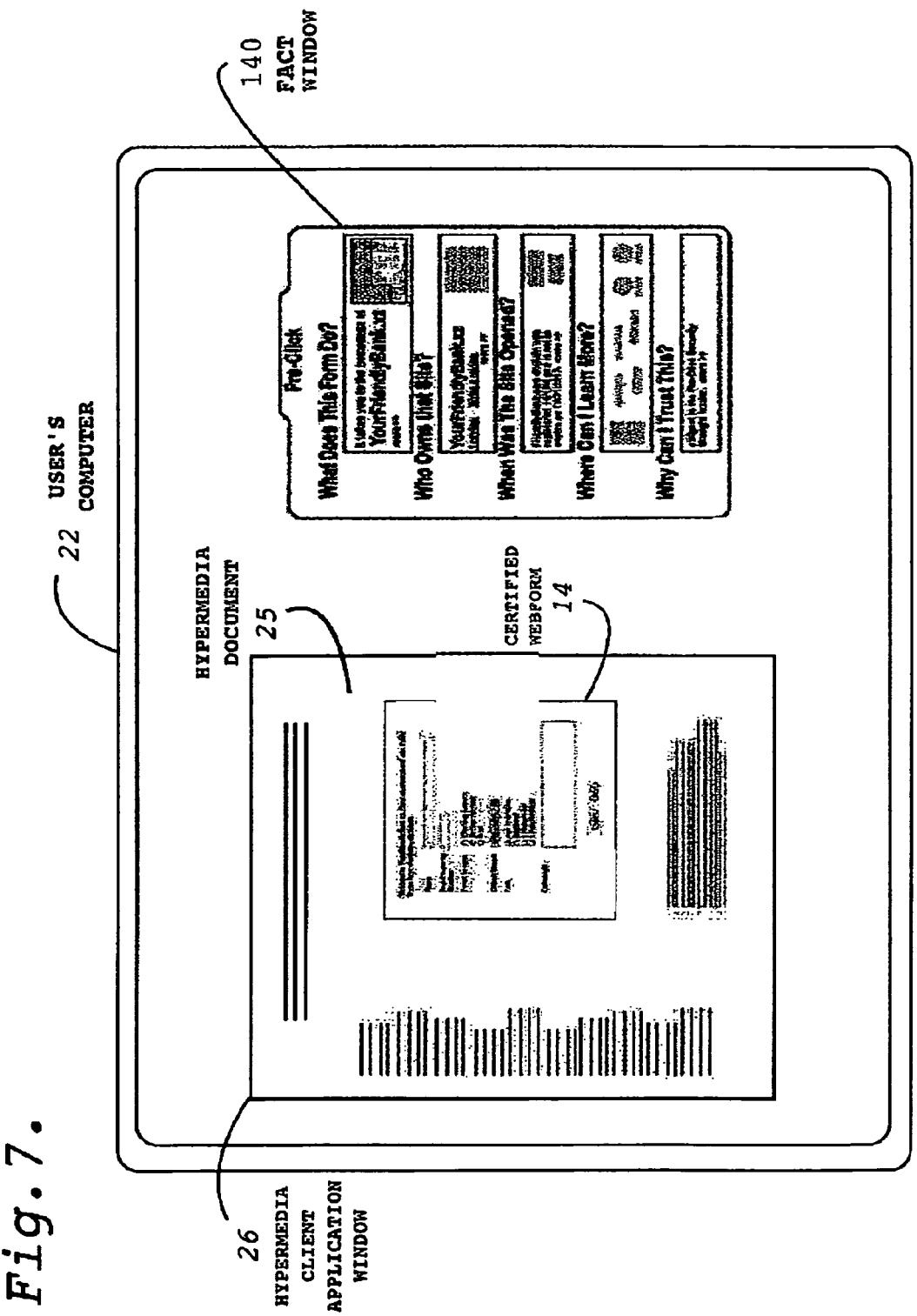
FIG. 7 illustrates an example rendering of facts for a certified webform on a user's screen in one embodiment of the disclosed technology.

FIG. 7 illustrates an example of how in one embodiment the Client renders the facts about the certified webform for the user in a separate fact window 140 that is distinct from the underlying application 26. Upon seeing the facts, the user can determine if he wants to manipulate the certified webform 14.

Figure 8:
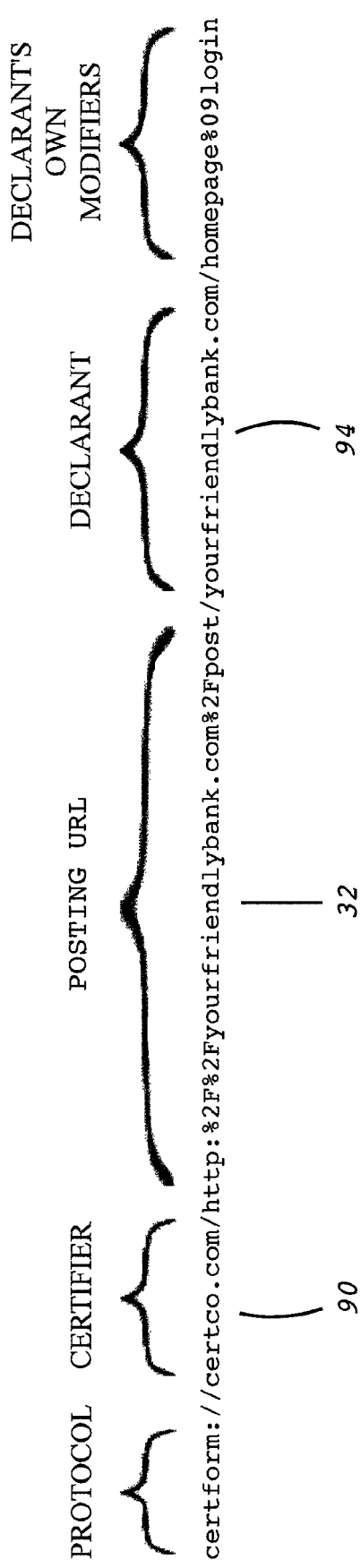
FIG. 8 illustrates a collision-free naming syntax for referencing facts about certified webforms in one embodiment of the disclosed technology, in which many Certifiers with many Declarants simultaneously participate.

FIG. 8 illustrates one example of how a webform might have a plurality of sets of facts associated with the webform, and a naming syntax that uniquely distinguishes between the sets of facts associated with the webform. A webform might for example have one set of facts associated with it asserted by Declarant A, and a different set of facts associated with it asserted by Declarant B. Similarly, a webform might have one set of facts certified by CertifierA, and a completely different set of facts certified by Certifier B. In effect, this webform fact naming scheme allows for the involvement of many different parties for many different reasons. The example illustrated in FIGURE X happens to use a URL syntax, however any functional equivalent suffices just as well.

As will be appreciated by those skilled in the art, the disclosed technology is preferably implemented as software, i.e., executable instructions that cause a computer or processor to implement the functionality described above. The executable instructions are stored on a non-transitory computer-readable media such as a CD ROM, hardrive, flash memory, integrated circuit, etc.

While illustrative embodiments have been illustrated and described, it will be appreciated that various changes can be made therein without departing from the spirit and scope of the invention. For example, it is possible to have many Certifiers which operate autonomously or cooperatively, with each operating under their own policies. Multiple Certifiers can independently establish trust relationships among themselves and Clients are permitted to query any number of Certifiers to determine and with their unique degrees of confidence about the facts associated with a webform and apply its own decision logic to determine its course of action.

The invention claimed is:

1. A method performed by a server to enroll a declarant to receive webform certification services, said method comprising:
    receiving from a client a request on behalf of a declarant to enroll said declarant to receive webform certification services;
    vetting the legitimacy of said declarant;
    determining to enroll said declarant to receive webform certification services; and
    transmitting to said client a response acknowledging that said declarant is enrolled to receive webform certification services.

2. A system comprising a processor and a communications interface, the system having software installed thereon, wherein the software is configured, when executed by the processor, to direct the system to:
    receive from a client a request on behalf of a declarant to enroll said declarant to receive webform certification services;
    vet the legitimacy of said declarant;
    determine to enroll said declarant to receive webform certification services; and
    transmit to said client a response acknowledging that said declarant is enrolled to receive webform certification services.

3. A method performed by a server to certify a webform on behalf of an enrolled declarant, said method comprising:
    receiving from a client a request to certify a webform on behalf of an enrolled declarant, said request comprising:
        the posting URL of said webform; and
        a plurality of facts for associating with said webform on behalf of said enrolled declarant;
    verifying that said enrolled declarant is enrolled to receive webform certification services;
    determining to certify said webform on behalf of said enrolled declarant;
    associating said plurality of facts with said webform on behalf of said enrolled declarant; and
    transmitting to said client a response acknowledging that said webform is certified on behalf of said enrolled declarant.

4. A system comprising a processor and a communications interface, the system having software installed thereon, wherein the software is configured, when executed by the processor, to direct the system to:
    receive from a client a request to certify a webform on behalf of an enrolled declarant, said request comprising:
        the posting URL of said webform; and
        a plurality of facts for associating with said webform on behalf of said enrolled declarant;
    verify that said enrolled declarant is enrolled to receive webform certification services;

determine to certify said webform on behalf of said enrolled declarant;

associate said plurality of facts with said webform on behalf of said enrolled declarant; and transmit to said client a response acknowledging that said webform is certified on behalf of said enrolled declarant.

5. A method performed by a server to decertify a certified webform on behalf of an enrolled declarant, said method comprising:

receiving from a client a request on behalf of an enrolled declarant to decertify a certified webform, said request comprising the posting URL of said certified webform;

verifying that said certified webform is certified on behalf of said enrolled declarant and that a plurality of facts are associated with said certified webform on behalf of said enrolled declarant;

determining to decertify said certified webform on behalf of said enrolled declarant;

disassociating said plurality of facts with said certified webform on behalf of said enrolled declarant; and transmitting to said client a response acknowledging that said certified webform is decertified on behalf of said enrolled declarant.

6. A system comprising a processor and a communications interface, the system having software installed thereon, wherein the software is configured, when executed by the processor, to direct the system to:

receive from a client a request on behalf of an enrolled declarant to decertify a certified webform, said request comprising the posting URL of said certified webform;

verify that said certified webform is certified on behalf of said enrolled declarant and that a plurality of facts are associated with said certified webform on behalf of said enrolled declarant;

determine to decertify said certified webform on behalf of said enrolled declarant;

disassociate said plurality of facts with said certified webform on behalf of said enrolled declarant; and transmit to said client a response acknowledging that said certified webform is decertified on behalf of said enrolled declarant.

7. A method performed by a server to resolve a certified webform for a client, said method comprising:

receiving from a client a request to resolve a certified webform, said request comprising the posting URL of a certified webform;

verifying that said certified webform is certified on behalf of an enrolled declarant and that a plurality of facts are associated with said certified webform on behalf of said enrolled declarant;

determining to resolve said certified webform for said client; and transmitting to said client said plurality of facts associated with said certified webform on behalf of said enrolled declarant.

8. A system comprising a processor and a communications interface, the system having software installed thereon, wherein the software is configured, when executed by the processor, to direct the system to:

receive from a client a request to resolve a certified webform, said request comprising the posting URL of a certified webform;

verify that said certified webform is certified on behalf of an enrolled declarant and that a plurality of facts are associated with said certified webform on behalf of said enrolled declarant;

determine to resolve said certified webform for said client; and transmit to said client said plurality of facts associated with said certified webform on behalf of said enrolled declarant.

9. A method performed by a server to modify a certified webform on behalf of an enrolled declarant, said method comprising:

receiving from a client a request to modify a certified webform on behalf of an enrolled declarant, said request comprising:

the posting URL of said certified webform;

zero or more first facts for associating with said certified webform on behalf of said enrolled declarant; and zero or more second facts for disassociating with said certified webform on behalf of said enrolled declarant;

verifying that said enrolled declarant is enrolled to receive webform certification services;

determining to modify said certified webform on behalf of said enrolled declarant;

associating said zero or more first facts with said certified webform on behalf of said enrolled declarant;

disassociating said zero or more second facts with said certified webform on behalf of said enrolled declarant; and transmitting to said client a response acknowledging that said certified webform is modified on behalf of said enrolled declarant.

10. A system comprising a processor and a communications interface, the system having software installed thereon, wherein the software is configured, when executed by the processor, to direct the system to:

receive from a client a request to modify a certified webform on behalf of an enrolled declarant, said request comprising:

the posting URL of said certified webform;

zero or more first facts for associating with said certified webform on behalf of said enrolled declarant; and zero or more second facts for disassociating with said certified webform on behalf of said enrolled declarant;

verify that said enrolled declarant is enrolled to receive webform certification services;

determine to modify said certified webform on behalf of said enrolled declarant;

associate said zero or more first facts with said certified webform on behalf of said enrolled declarant;

disassociate said zero or more second facts with said certified webform on behalf of said enrolled declarant; and transmit to said client a response acknowledging that said certified webform is modified on behalf of said enrolled declarant.

* * * * *